Patented Jan. 31, 1939

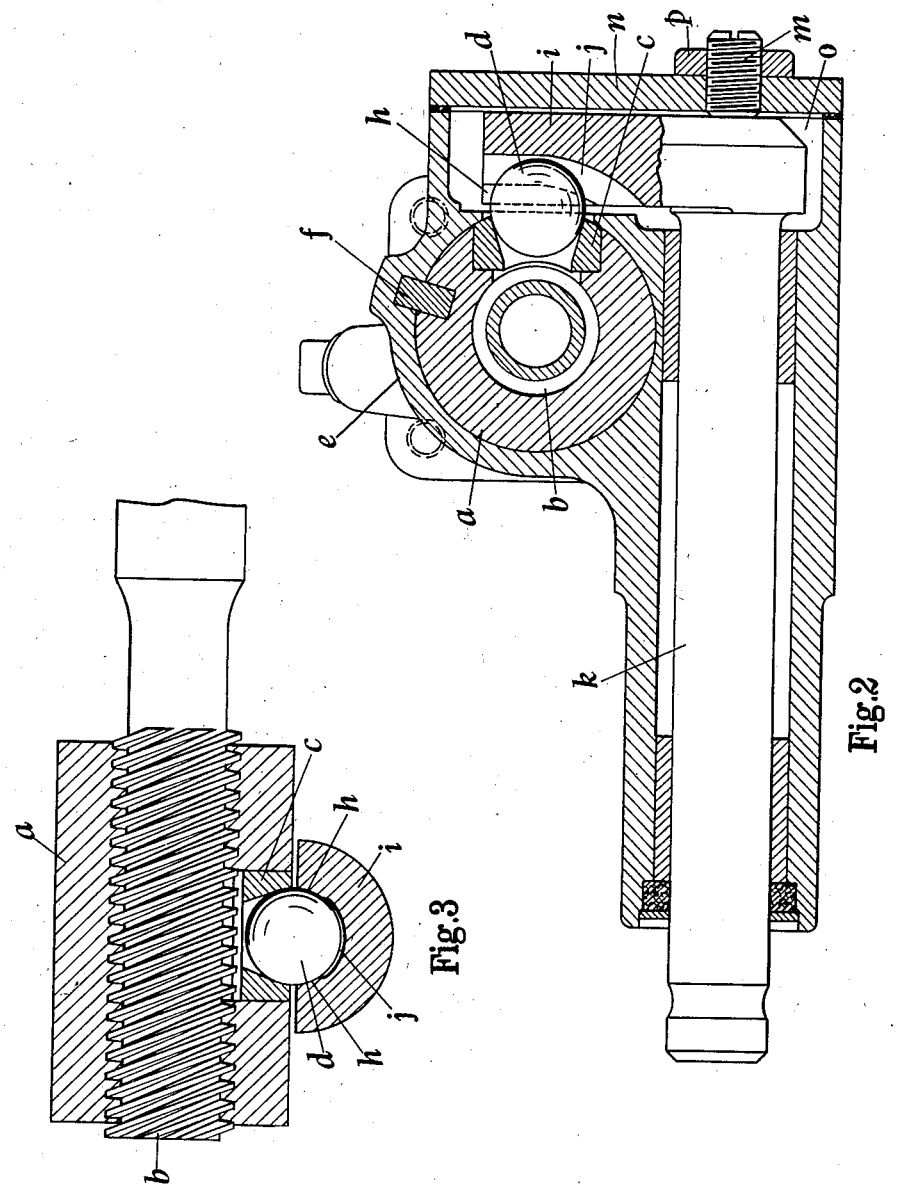

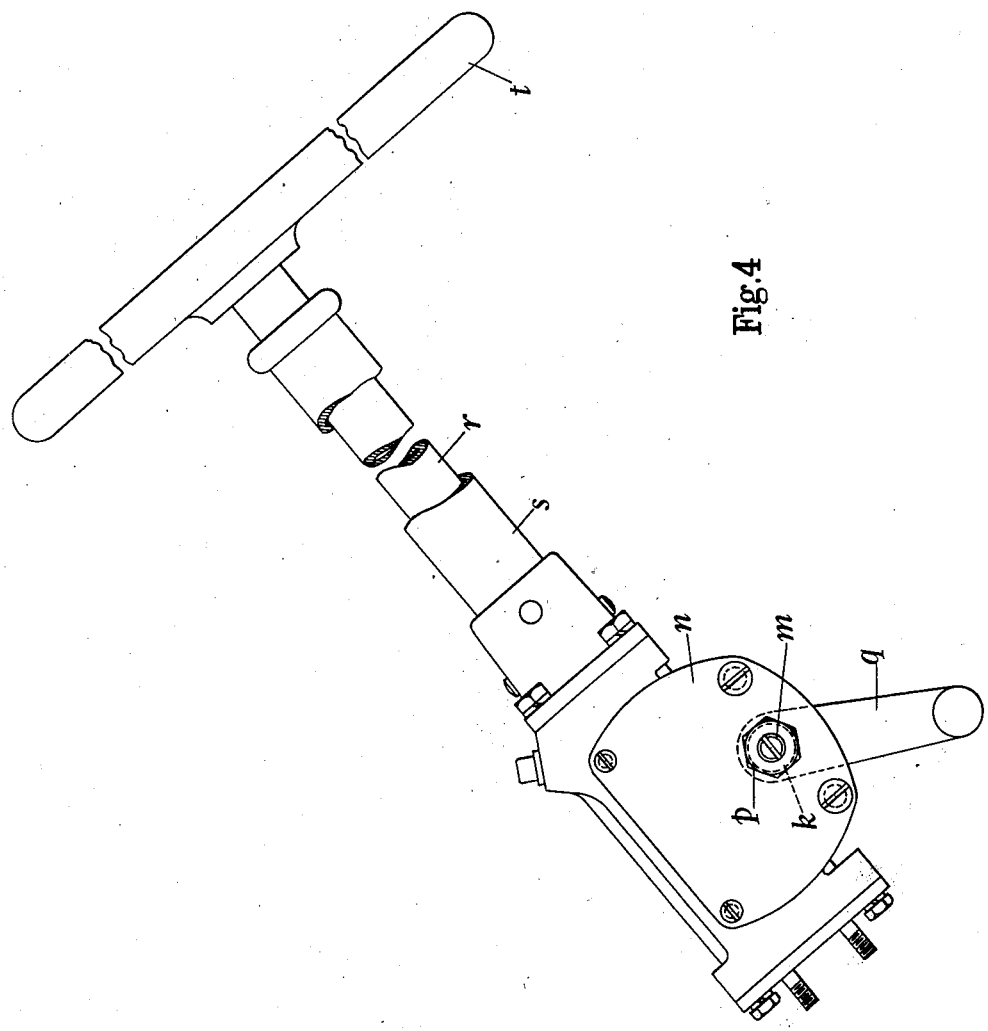

2,145,751

UNITED STATES PATENT OFFICE 2,145,751

MOTOR VEHICLE STEERING MECHANISM

Walter Henry Briggs, Birmingham, England, assignor to Burman & Sons Limited, Birmingham, England Application March 3, 1938, Serial No. 193,741
In Great Britain December 8, 1937

3 Claims. (Cl. 74—499)

This invention relates to motor vehicle steering mechanism of the type in which a screw thread on the lower end of the steering shaft engages a slidable nut, the latter being connected to an arm or lever for actuating the linkage associated with the road wheels.

The object of the invention is to provide an improved connection between the nut and arm.

The invention comprises the combination with adjacent portions of the nut and arm, of a ball which occupies a seating in the nut and engages a longitudinal groove in the arm.

In the accompanying sheets of explanatory drawings:—

Figure 2 is a cross section on the line 2—2 of Figure 1.

Figure 3 is a sectional plan illustrating the screw threaded portion of the steering shaft, together with the nut, arm and the connecting means forming the subject of the invention.

Figure 4 is a side elevation drawn to a smaller scale than Figures 1 to 3, of motor vehicle steering mechanism to which the invention can be applied.

Figure 1:
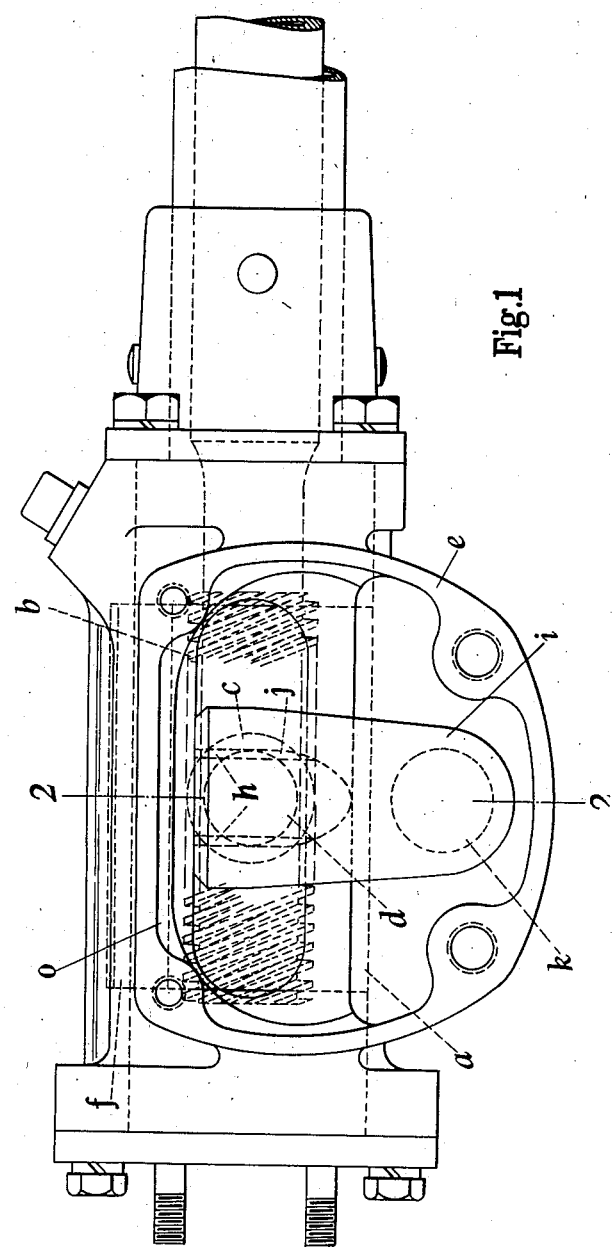
Figure 1 is a side elevation of a portion of a motor vehicle steering mechanism provided with this invention, the side cover plate of the said portion being omitted.

In carrying the invention into effect as shown, I provide a cylindrical nut $a$ on the screw threaded end $b$ of the steering shaft, and I mount in one side of the nut $a$ a bush $c$ of steel or other metal having a conical bore serving as a seating for a steel or other metal ball $d$. This ball $d$ is made of as large diameter as is convenient, and the bush $c$ is such as will accommodate nearly one half of the ball as shown.

The nut $a$ is slidably arranged in a cylindrical bore formed in a housing $e$, and is prevented from rotation by a key $f$ engaging both the housing and the nut, an opening being provided in one side of the housing $e$ to allow the ball $d$ to extend through it into engagement with the arm $i$.

The arm $i$ is situated with one of its faces adjacent to one side of the nut $a$, and in this face is formed a longitudinal groove $j$ having straight and parallel edges shaped to form a seating $h$ for the part of the ball $d$ projecting from the bush $c$.

The axis of the oscillatory spindle $k$ on one end of which the arm $i$ is formed or secured is arranged parallel with a plane passing through the centre of the ball $d$ and the axis of the nut $a$, and the adjustment of the arm $i$ required for holding the ball $d$ in contact with its seatings in the arm $i$ and bush $c$ is obtained by axial movement of the spindle $k$, this being effected by a set screw $m$ acting on the outer side of the arm $i$ at a position containing the axis of the spindle $k$. The set screw $m$ is carried by a removable cover plate $n$ closing the open outer side of a chamber $o$ which is formed in one side of the housing $e$ for accommodating the arm $i$, a lock nut $p$ being mounted on the set screw $m$ for securing it in its adjusted position. The spindle $k$ is supported in the housing $e$, and at the end remote from the arm $i$ projects from the housing, this end being adapted for connection to the usual linkage as $q$ (Figure 4) associated with the road wheels. In Figure 4, $r$ indicates the steering shaft which is provided with the screw threaded end $b$ (Figures 1 to 3), and $s$, $t$ indicate respectively the usual steering pillar and wheel.

By this invention a robust and durable connection between the nut and arm is obtained in a very simple and convenient manner.

Having thus described my invention what I claim as new and desire to secure by Letters Patent is:—

1. Motor vehicle steering mechanism comprising the combination of a screw threaded end portion of a steering shaft, a stationary housing in which the screw threaded end portion of the shaft is arranged, a nut slidably but non-rotatably supported in the housing and engaging the screw threaded end portion of the shaft, a rocker arm adapted to be actuated by the nut, and a ball interconnecting adjacent portions of the arm and nut, the nut being provided with a seating for the ball, and the arm being provided with a longitudinal groove for engagement by the ball.

2. Mechanism as claimed in claim 1 and comprising a spindle carrying the arm and arranged parallel with a plane passing through the centre of the ball and the axis of the nut, and means for imparting axial adjusting movement to the spindle for the purpose described.

3. Motor vehicle steering mechanism comprising the combination of a screw threaded end portion of a steering shaft, a stationary housing in which the screw threaded end portion of the shaft is arranged, a nut slidably but non-rotatably supported in the housing and engaging the screw threaded end portion of the shaft, a rocker arm adapted to be actuated by the nut, and a ball interconnecting adjacent portions of the arm and nut, the nut being provided in one side with a bush shaped to provide a conical seat for the ball, and the arm being provided with a longitudinal groove for engagement by the ball.

WALTER HENRY BRIGGS.